(No Model.)

J. DAVIS.
WATER FILTER.

No. 486,860. Patented Nov. 29, 1892.

Witnesses:

Inventor:

UNITED STATES PATENT OFFICE.

JOSEPH DAVIS, OF SAN FRANCISCO, CALIFORNIA.

WATER-FILTER.

SPECIFICATION forming part of Letters Patent No. 486,860, dated November 29, 1892.

Application filed May 2, 1892. Serial No. 431,428. (No model.)

*To all whom it may concern:*

Be it known that I, JOSEPH DAVIS, a citizen of the United States, residing in the city and county of San Francisco, State of California, have invented certain new and useful Improvements in Water-Filters, of which the following is a specification.

My invention relates to water-filtering apparatus of the kind that are connected directly to the service-pipe and work under pressure; and it has for its object, mainly, to provide a filter that is specially adapted for hotels, restaurants, and other places where, through the constant operation of the apparatus, the filtering material requires to be frequently cleansed or renewed.

To such end and object my invention consists in the described construction and combination of parts, producing an improved filter.

The following description explains the manner in which I proceed to construct my improved filter, the accompanying drawings, forming part of this specification, being referred to by letters.

Figure 1:
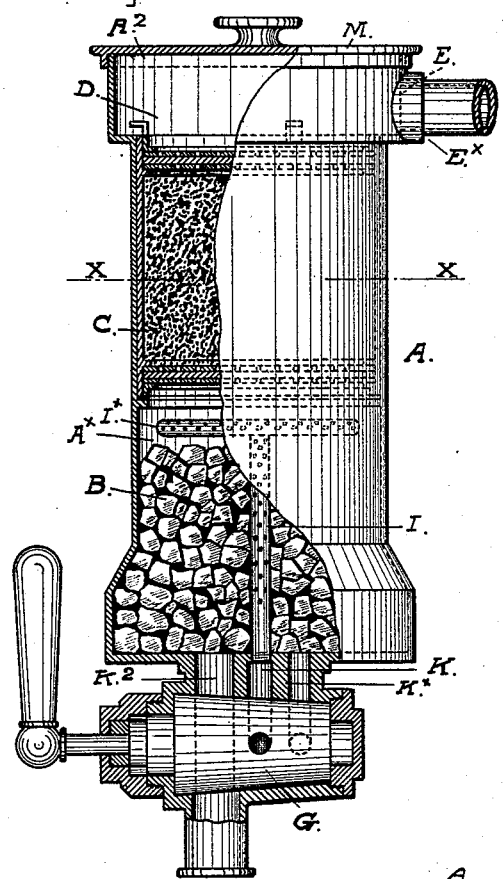
Figure 3:
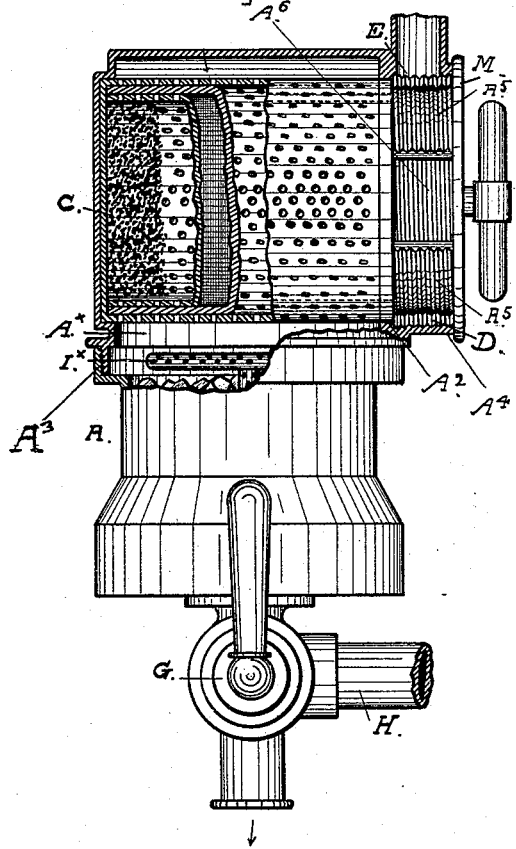
Figure 2:
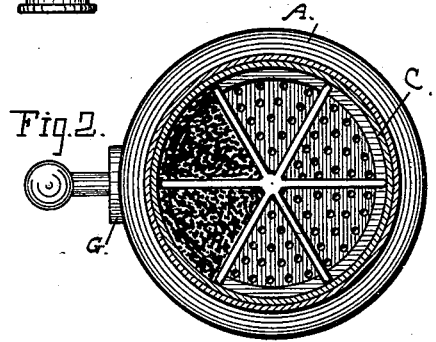

Figure 1 is a side elevation of my improved filter, showing the outer shell or body broken away from top to bottom on one side of the center and the faucet-body and water-passages in vertical section. Fig. 2 is a horizontal section through the filter, Fig. 1, on the line $x\ x$. Fig. 3 represents another construction, in which the removable filtering-chamber is taken out and removed through the side instead of at the top of the filter-body, the front being broken away and the filtering-chamber and parts being shown in vertical section.

A indicates the shell or body of the filter, having the lower part filled with coarse filtering material B—such as pebbles, small stones, and gravel—or other matter of the kind commonly used in filters of this class.

C is a removable cylinder fitted into the body A above the coarse matter B and separating a space or chamber D at the top of the body from the lower part containing the coarse filtering material. The cylinder C is filled with fine charcoal and has perforations in its body to permit passage of the water from the outside through the body of charcoal and thence outward into the chamber D, and E is an outlet, with a coupling $E^{\times}$ for a pipe to carry the filtered water from the chamber into a suitable reservoir or vessel or from which the water can be drawn off or served, as required.

G is a three-way cock or faucet on the bottom of the filter-body, and H is a water-supply pipe, which may be either the service-pipe of the building or a pipe supplying water under suitable head or pressure.

I is a perforated pipe with an annular head or ring $I^{\times}$ at the top, also perforated and connected at the lower end to one of the water-passages in the faucet-body, from which it extends upward through the filtering material B and sits in close relation to the lowermost side or bottom of the cylinder C. In addition to this inlet and passage K the plug controls a direct inlet and passage $K^{\times}$, leading into the chamber $A^{\times}$ and a direct discharge $K^2$ from the bottom of the chamber. The object of this construction is to control and direct by means of the plug or faucet the flow of water into and upward through the filtering material under full head or pressure, or by another adjustment to force the water in a spray or fine stream through the filtering material and against the perforated under side or bottom of the filtering-cylinder to wash out and cleanse such matter and surfaces. In this last-described adjustment the remaining outlet and passages $K^2$ through the plug will be thrown open for escape of the wash-water and the matter carried out by it. By turning the handle of the plug from the position represented in Fig. 1 one-half a revolution into the opposite position both inlets will be closed, but the outlet $K^2$ will be opened. By this arrangement of the inlets and outlets the water-pressure is used to wash out and cleanse the body of coarse filtering material and the outside perforated surface of the removable cylinder C, against which the unfiltered water first impinges or comes in contact. This is done at intervals more or less frequent, according to the character of the water, especially where the water carries a considerable proportion of sand or other solid matter. It should be mentioned, however, that the same construction and arrangement of faucet and wash-out pipes with the chamber $A^x$ is described in a prior application for Letters Patent, filed by me in the Patent Office on or about the 23d day of February, 1892, Serial No. 422,517, on which this present application is an improvement, particularly with respect to the filtering-cylinder and the upper portion of the filter-body. The cylinder C should have a close fit with the surrounding sides of the shell or body, so that the water admitted into the chamber $A^x$ under pressure cannot enter the receiving space or chamber D except by passing through the outer perforated surfaces and the confined body of filtering material in the cylinder. An opening $A^2$ of proper size is provided in the shell or body through which the filtering-cylinder is inserted in place or is readily removed when a new or clean cylinder is to be set in position. This opening is closed by a cap M with a screw-joint, and a gasket or other suitable means is used to render it water-tight.

In that construction shown in Fig. 1 the filtering-cylinder C is set in and taken out through the top of the filter-body and the upper part of the body standing above the upper end of the filtering-cylinder is increased in diameter to produce a large receiving-space D for the filtered water, while in that construction represented in Fig. 3 the cylinder is inserted through the side of the shell A, and the opening $A^2$ and its cap are therefore situated at the side instead of on the top of the shell. Either construction affords access to the chamber receiving the filtered water to remove the foul filtering-cylinder and substitute a clean cylinder without disconnecting the apparatus or disturbing the lower filtering-chamber by simply turning off the water and removing the cap; but the change in the location of the opening involves a corresponding change in the cylinder, as the perforated surfaces in that form where the cylinder sets upright are located in the flat ends or heads of the cylinder alone, whereas in the other case the horizontal position brings the cylindrical surfaces into position longitudinally across the filter-body, and consequently the perforations have then to be made in the body of the cylinder and in the front end, but leaving the rear end solid. These perforated surfaces in both cases are formed of an inner and an outer perforated diaphragm or plate and a layer of felt or asbestos or some fibrous or textile material suitable for a fine filtering medium interposed and confined between the two perforated plates. In Fig. 1 these filtering-surfaces of the cylinder consists of perforated disks or circular plates fitted tightly into the ends of the cylinder with a disk of the porous material interposed between them; but in the modification shown in Fig. 3 the body of the cylinder has double walls with a layer of asbestos in the space between them, and both the inner and the outer wall and the head or front end is perforated and formed the same as the head of the removable cylinder in the other construction of two plates with the asbestos between them. The inner end of the cylinder, however, is closed and the interior space is filled with fine charcoal or some suitable filtering substance. The filter-body A is made either in one piece without a joint or it is formed of two parts united by a screw-joint $A^3$, as shown in Fig. 3.

In the last-mentioned construction the filtered water-chamber D is located on the side instead of on the top of the body, and is produced by extending from the side of the shell A a circular rim $A^4$. This rim has an internal screw-thread, and the removable cylinder has a neck or standing rim $A^5$ on its head, which is threaded to fit the screw-rim $A^4$. The cap or cover M to close the opening is fixed on the threaded rim to close tightly against the edge of the rim $A^4$, when the cylinder is inserted in place, and its threaded rim is screwed down into the rim $A^4$. Apertures $A^6$ are cut through the rim for the filtered water to pass through the outlet. In this arrangement of the filtering-chamber the water from the lower chamber $A^x$ passes through the perforated sides and the front end of the cylinder and into the space D from which it is drawn off through the outlet.

As thus constructed and arranged the filtering-cylinder can be readily removed when foul and a clean one inserted in its place as often as necessary without disconnecting the filter or taking it apart.

Having thus fully described my invention, what I claim, and desire to secure by Letters Patent, is—

1. The herein-described water-filter, consisting of the body A, having an opening for the insertion and removal of the filtering-cylinder, the said casing being divided into two compartments, the lower space or compartment $A^x$ containing filtering material, such as pebbles or coarse gravel, the removable filtering-cylinder C, having perforated filtering-surfaces with double walls and interposed fibrous material between and the removable radial partition in said cylinder, the ledge or bead in said casing for supporting the removable filtering-cylinder, the chamber D to receive the filtered water and having an outlet E, a three-way stop-cock secured to the bottom of said casing and communicating therewith, and a perforated cleaner I in the lower compartment $A^x$ and connected with the three-way stop-cock, all constructed and arranged substantially in the manner and for operation as set forth.

2. In a water-filter of the character described, the combination, with a casing A, reservoir D, a removable top M therefor, outlet E, three-way stop-cock secured to the bottom of said casing, and a rinser I, having an annular head or top I$^\times$ secured in the bottom of said casing and connecting with said cock, of a removable cylinder having double perforated walls, fibrous filtering material between said walls, the removable radial partitions in said cylinder, and the rim or bead upon which the said cylinder is supported, as set forth.

In testimony that I claim the foregoing I have hereunto set my hand and seal.

JOSEPH DAVIS. [L. S.]

Witnesses:
  EDWARD E. OSBORN,
  CHAS. E. KELLY.